United States Patent
Vonier et al.

(10) Patent No.: US 10,953,913 B2
(45) Date of Patent: Mar. 23, 2021

(54) ELECTROMECHANICAL POWER STEERING SYSTEM HAVING A PIVOTABLE BEARING FOR A HELICAL GEARING

(71) Applicants: THYSSENKRUPP PRESTA AG, Eschen (LI); thyssenkrupp AG, Essen (DE)

(72) Inventors: Felix Vonier, Schruns (AT); Christian Kohler, Heiligkreuz (CH); Eugen Lass, Heerbrugg (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 274 days.

(21) Appl. No.: 16/300,448

(22) PCT Filed: May 17, 2017

(86) PCT No.: PCT/EP2017/061831
§ 371 (c)(1),
(2) Date: Nov. 9, 2018

(87) PCT Pub. No.: WO2017/202664
PCT Pub. Date: Nov. 30, 2017

(65) Prior Publication Data
US 2019/0225258 A1   Jul. 25, 2019

(30) Foreign Application Priority Data
May 23, 2016 (DE) ............ 10 2016 006 156.1

(51) Int. Cl.
*B62D 5/04* (2006.01)
*F16H 1/16* (2006.01)
*F16H 57/021* (2012.01)

(52) U.S. Cl.
CPC ............ *B62D 5/0409* (2013.01); *F16H 1/16* (2013.01); *F16H 57/021* (2013.01); *F16H 2057/0213* (2013.01)

(58) Field of Classification Search
CPC ............... B62D 5/0409; F16H 57/021; F16H 2057/0213; F16D 1/12
See application file for complete search history.

(56) References Cited

U.S. PATENT DOCUMENTS

2002/0195893 A1* 12/2002 Kobayashi ........... B62D 5/0409
310/83
2012/0272765 A1* 11/2012 Fuechsel ................. F16C 23/06
74/416

(Continued)

FOREIGN PATENT DOCUMENTS

| CN | 204452577 U | 7/2015 |
| CN | 105008208 A | 10/2015 |

(Continued)

OTHER PUBLICATIONS

English Translation of International Search Report issued in PCT/EP2017/061831, dated Jul. 7, 2017.

*Primary Examiner* — Tony H Winner
(74) *Attorney, Agent, or Firm* — thyssenkrupp North America, LLC

(57) ABSTRACT

An electromechanical power steering system having an electric servo motor having a motor shaft. The electric servo motor drives a shaft which meshes with a helical wheel. The shaft is rotatably supported in a gear mechanism housing. The motor shaft is coupled to the shaft in a rotationally secure manner by a coupling which compensates for an axial offset. The shaft at the end thereof close to the motor is supported in a bearing in the gear mechanism housing so as to be able to be rotated about a rotation axis and is pivotably supported about a pivot axis which is perpendicular to the (Continued)

rotation axis in such a manner that the pivot axis is arranged in the region of the coupling.

20 Claims, 4 Drawing Sheets

(56) References Cited

U.S. PATENT DOCUMENTS

| | | | |
|---|---|---|---|
| 2013/0025960 A1 | 1/2013 | Hama | |
| 2014/0080610 A1* | 3/2014 | Nakagawa | F16D 3/68 464/73 |
| 2016/0031473 A1 | 2/2016 | Riepold | |
| 2016/0101808 A1* | 4/2016 | Tomizawa | H02K 7/081 180/444 |
| 2016/0194024 A1* | 7/2016 | Kikuchi | F16H 55/22 180/444 |
| 2018/0195602 A1* | 7/2018 | Segawa | F16H 55/24 |
| 2019/0226556 A1* | 7/2019 | Meixner | B60K 17/16 |
| 2020/0318725 A1* | 10/2020 | Meixner | F16C 19/38 |

FOREIGN PATENT DOCUMENTS

| | | | | |
|---|---|---|---|---|
| DE | 202 21 954 U | 8/2009 | | |
| DE | 102008001878 A | 11/2009 | | |
| DE | 10 2008 056 024 A | 5/2010 | | |
| DE | 102014105921 A | 10/2015 | | |
| JP | 2006 111133 A | * 4/2006 | | B60K 17/16 |
| JP | 2006111133 A | 4/2006 | | |
| JP | 2011157034 A | 8/2011 | | |
| JP | 2013208933 A | 10/2013 | | |
| KR | 2010-0073550 A | 7/2010 | | |
| KR | 2013-0003312 A | 1/2013 | | |

* cited by examiner

ELECTROMECHANICAL POWER STEERING SYSTEM HAVING A PIVOTABLE BEARING FOR A HELICAL GEARING

CROSS REFERENCE TO RELATED APPLICATIONS

This application is a U.S. National Stage Entry of International Patent Application Serial Number PCT/EP2017/061831, filed May 17, 2017, which claims priority to German Patent Application No. DE 10 2016 006 156.1, filed May 23, 2016, the entire contents of both of which are incorporated herein by reference.

FIELD

The present disclosure generally relates to an electromechanical power steering system.

BACKGROUND

In electromechanical power steering systems, there is produced by means of an electric motor a torque which is transmitted to a gear mechanism and which is superimposed at that location on the steering torque provided by the driver.

A generic electromechanical power steering system comprises an electric power steering system which drives a worm shaft which meshes with a worm wheel which is arranged on a steering shaft, wherein the worm wheel is operationally connected to an input shaft of a steering gear mechanism and wherein the worm shaft and the steering shaft are rotatably supported in a common gear mechanism housing.

DE 10 2008 001 878 A1 and DE 10 2014 105 921 A1 disclose a pivot bearing for a worm gear mechanism, wherein the worm is supported by means of a gimbal-mounted bearing ring. The bearing ring comprises in this instance a pivot axis, which extends perpendicularly to the rotation axis and in the direction of the worm wheel. This embodiment has been found to be disadvantageous since the coupling is more heavily loaded, whereby the coupling over time becomes more rapidly worn and an increased toothed flank play occurs with corresponding vibration noises.

Thus a need exists for an electromechanical power steering system with a worm gear mechanism in which the coupling between the engine shaft and worm shaft is less heavily loaded.

DETAILED DESCRIPTION

Figure 1:
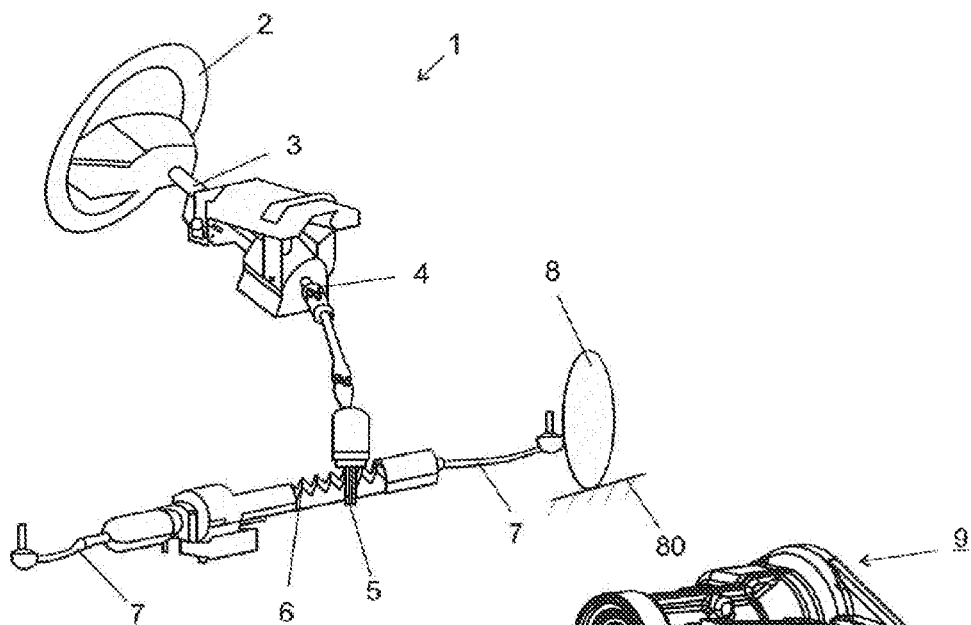
FIG. 1 is a schematic view of an electromechanical power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electromechanical power steering system.

Accordingly, an electromechanical power steering system having an electric servo motor which drives a shaft which meshes with a helical wheel is provided with a motor shaft, wherein the shaft is arranged in a gear mechanism housing and is supported at the end thereof close to the motor in a bearing so as to be able to be rotated about a rotation axis, and wherein the motor shaft is coupled to the shaft in a rotationally secure manner by means of a coupling which compensates for an axial offset. The axial offset between the shaft and the motor shaft extends in an axially parallel manner and/or in axes which are angular with respect to each other. Since according to the invention the shaft is further pivotably supported about a pivot axis which is perpendicular to the rotation axis, wherein the pivot axis is arranged in the region of the coupling and extends through the coupling, and consequently the bearing of the pivot axis is close to the coupling, the loading of the coupling during operation is reduced.

Preferably, the bearing comprises a roller bearing which supports the shaft rotatably about the rotation axis, wherein the bearing is arranged in a carrier. The pivoting is preferably enabled by means of two pins which are arranged in the bearing and in the gear mechanism housing.

In this instance, it is preferable for a carrier of the roller bearing to comprise opposing holes and for the gear mechanism housing to accordingly comprise corresponding recesses for receiving the pins.

It is advantageous for the pins to be cylindrical pins and consequently to enable a pivoting of the bearing about the pivot axis which is formed thereby.

Preferably, the pivot axis is located approximately in the center of the coupling. In this instance, the pivot axis may preferably extend precisely through a coupling pivot axis of the coupling.

In a preferred embodiment, the carrier of the roller bearing is constructed in a pot-like manner and comprises a pot edge which projects axially beyond an inner ring of the roller bearing in the direction of the coupling.

For the pivot axis, the holes are preferably located in the region of the pot edge.

It is preferable for a sliding bearing, for example, with sliding bushes for receiving the pins, to be provided in the recesses in the gear mechanism housing.

In a further preferred manner, the helical wheel is a worm wheel and the shaft is a worm shaft of a worm gear mechanism.

In this instance, the worm wheel may be operationally connected to an input shaft of a steering gear mechanism and the worm wheel may be arranged on a steering shaft.

The coupling between the motor shaft and the shaft of the gear mechanism preferably comprises two coupling components which engage one inside the other and which are each connected to the corresponding shaft by means of a bearing bush in a rotationally secure manner.

In FIG. 1, an electromechanical motor vehicle steering system 1 having a steering wheel 2, which is coupled in a rotationally secure manner to an upper steering shaft 3 and a lower steering shaft 4, is schematically illustrated. The upper steering shaft 3 is functionally connected to the lower steering shaft 4 by means of a torsion bar. The lower steering shaft 4 is connected to a pinion 5 in a rotationally secure manner. The pinion 5 meshes in a known manner with a tooth segment of a toothed rack 6. The toothed rack 6 is displaceably supported in a steering housing in the direction of the longitudinal axis thereof. At the free end thereof, the toothed rack 6 is connected to tie rods 7 by means of ball joints which are not illustrated. The tie rods 7 themselves are connected in a known manner by means of axle members to a respective steered wheel 8 of the motor vehicle. A rotation of the steering wheel 2 leads via the connection of the steering shaft 3, 4 and the pinion 5 to a longitudinal displacement of the toothed rack 6 and consequently to a pivoting of the steered wheels 8. The steered wheels 8 are subjected via a roadway 80 to a retroactive effect which counteracts the steering movement. In order to pivot the wheels 8, there is consequently required a force which makes a corresponding torque on the steering wheel 2 necessary. An electric motor of a servo unit is provided in order to support the driver during this steering movement. The servo unit may in this instance be arranged as a superimposed steering system on the steering column or as an auxiliary force support device on the pinion or the toothed rack.

Figure 2:
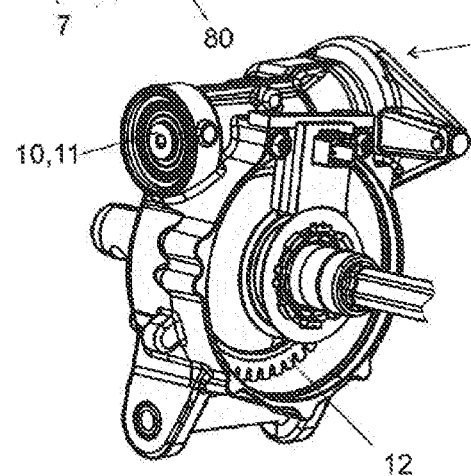
FIG. 2 is a perspective view of the gear mechanism of the power steering system of FIG. 1.

In FIG. 2, the gear mechanism 9 of the servo unit is illustrated. A servo motor which is not illustrated drives a worm shaft 10 which is in engagement with the worm 11 thereof with a worm wheel 12 which is connected to the lower steering shaft 4 or the pinion 5 in a rotationally secure manner. During operation of the electric motor 13, the worm shaft 10 is driven and the worm 11 and the worm wheel 12 rotate accordingly in order to provide a rotation support for the lower steering shaft 4 or to introduce a support torque directly into the pinion 5.

Figure 3:
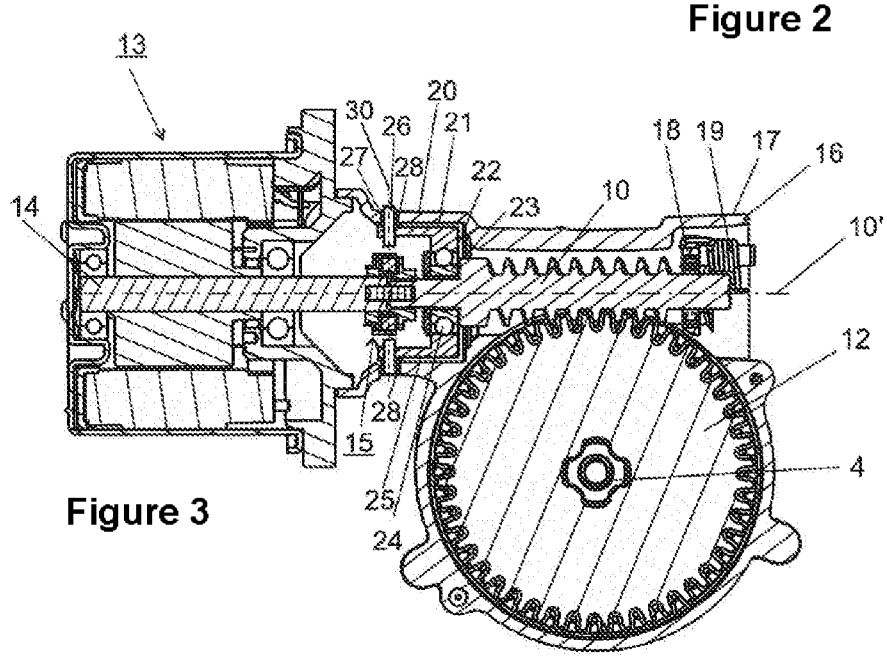
FIG. 3 is a longitudinal sectional view of the gear mechanism of FIG. 2 along the worm shaft.

In FIG. 3, the gear mechanism 9 is illustrated as a longitudinal section. The longitudinal section extends in this instance along a rotation axis 10' of the worm shaft 10 which is driven by the electric motor 13. The electric motor 13 comprises a motor shaft 14 which is coupled via a coupling 15 to the worm shaft 10 in a rotationally secure manner.

Such couplings 15 may compensate for alignment errors of the axles, that is to say, angular deviations which may occur during operation or during assembly. There may also be provided couplings which can compensate for a parallel offset of the coupled axles, for example, so-called "Oldham couplings". Preferably, the coupling 15 is capable of compensating for both the errors mentioned.

The coupling 15 preferably comprises two coupling components which engage one inside the other with a concentric bearing seat, wherein the engagement of the coupling components has play. The coupling components are connected to the corresponding shaft in a positive-locking manner in each case by means of a cylindrical bearing bush which is arranged in the bearing seat. The coupling components are in this instance axially pretensioned by means of a concentrically arranged helical spring which is arranged between the coupling components in the bearing bushes. The coupling 15 shown is rotationally secure and, as a result of the play of the engagement of the coupling components, an axial offset or alignment error between the rotation axis of the motor shaft 14 and the rotation axis of the worm shaft 10 can be compensated for.

The worm shaft 10 meshes via the worm tooth arrangement with the worm wheel 12. The worm wheel 12 in turn is connected in a rotationally secure manner, for example, to a steering shaft 4 which extends between a steering wheel which is not illustrated and the actual steering gear mechanism of the motor vehicle. The structural elements mentioned are supported in a common gear mechanism housing 16.

The bearing of the worm shaft 10 in the gear mechanism housing 16 is carried out at an end 17 of the worm shaft 10 remote from the motor in a roller bearing 18 which is constructed as a ball bearing and which permits slight axial movements and slight changes of the rotation axis of the worm shaft 10 with respect to the gear mechanism housing 16. The position of the worm shaft 10 can be adjusted with respect to the worm wheel 12 by means of a pretensioning device 19. The adjustment is preferably carried out in this instance at the side 17 of the worm shaft 10 remote from the motor.

The worm shaft 10 further has an end 20 which is close to the motor and which is supported in a pivotable bearing arrangement. The bearing arrangement comprises a roller bearing 22 with an inner ring 23, roller members 24 and an outer ring. The roller members 24 extend in grooves between the inner ring 23 and the outer ring. The outer ring is retained by a carrier 25 which is secured by means of cylindrical pins 26 in the gear mechanism housing 16. In particular, the outer ring may also be constructed integrally with the carrier 25, as illustrated in the drawings.

The gear mechanism housing 16 comprises in the region of the flexible coupling 15 mutually opposing recesses 27 which are in alignment with each other for receiving sliding bushes 28. The carrier 25 of the roller bearing 22 comprises apertures or holes 29 which correspond to the recesses 27. The two cylindrical pins 26 each extend through a hole 29 in the carrier 25 and are received by the sliding bush 28 in the gear mechanism housing 16. The cylindrical pins 26 consequently enable a pivoting of the bearing 21 or the roller bearing 22 and consequently form a pivot axis 30 for the worm shaft 10. The pivot axis 30 is preferably located in the center of the coupling 15 or extends through the coupling pivot axis. The bearing outer ring 25 is constructed in a pot-like manner, wherein the holes 29 are arranged in the region of the pot edge and the grooves for the roller members 24 are formed in the top base. As a result of the pot-like configuration, the pivot axis 30 of the bearing 21 can move as close as possible to the coupling interface. The carrier 25 preferably has in this instance at the outer side, the side remote from the ball, a height which is at least twice as high as the height of the bearing inner ring 23 at the side remote from the ball.

Figure 4:
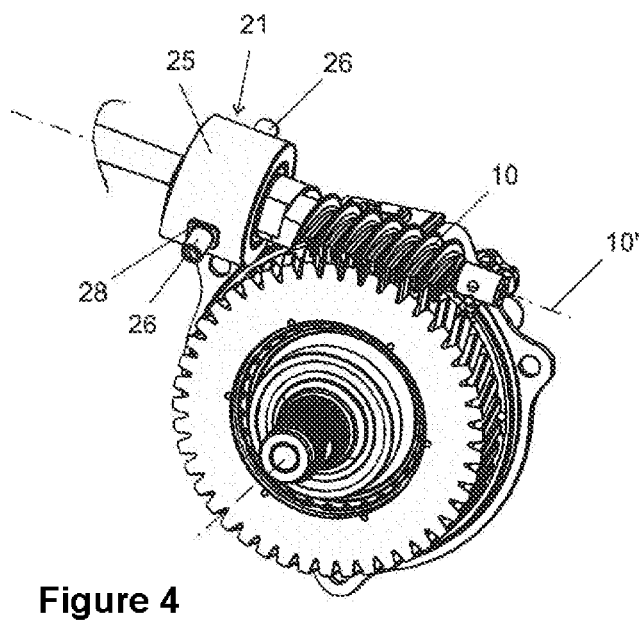
FIG. 4 is another perspective view of the gear mechanism.

FIG. 4 shows the worm shaft 10 with the cardan bearing 21, the carrier 25 and the cylindrical pins 26 and the worm wheel 12 which meshes with the worm shaft 10 as a perspective illustration, wherein the components of the gear mechanism housing and of the electric motor have been dispensed with.

Figure 5:
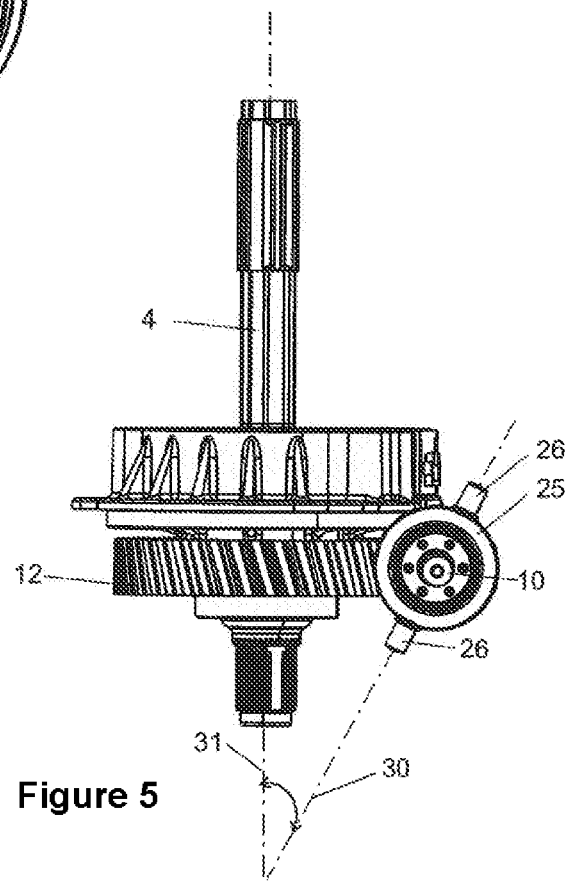
FIG. 5 is a plan view of the gear mechanism in the direction of the worm shaft.

In FIG. 5, it can be seen that the pivot axis 30 of the worm shaft 10 predetermined by the pins 26 comprises a defined angle with respect to the rotation axis 31 of the worm wheel 12 or the steering shaft 4. This angle is dependent on the positioning/orientation of the pivot lever and is important for a uniform breakaway torque which is independent of the steering direction.

Figure 6:
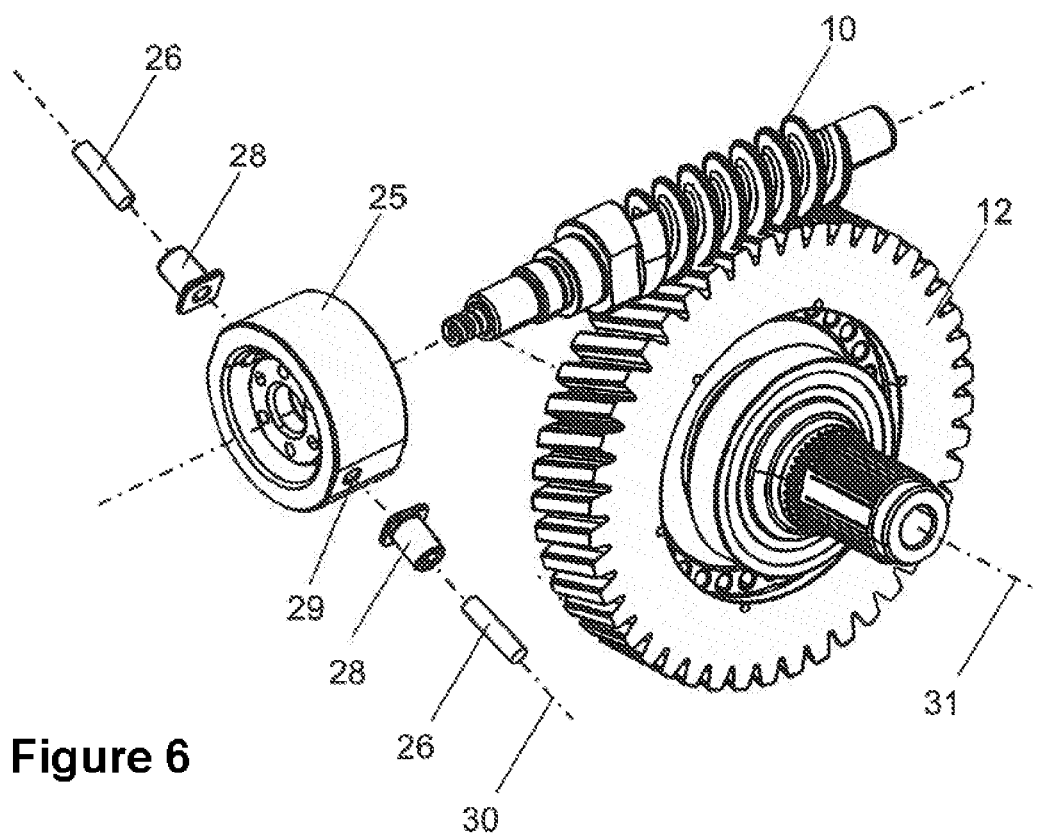
FIG. 6 is an exploded view of the bearing of the worm shaft.

FIG. 6 shows the details of the bearing 21 as an exploded illustration. In addition to the worm shaft 10 and the worm wheel 12 which is in engagement therewith, the bearing outer ring 25 is illustrated with the holes 29 thereof. The cylindrical pins 26 are in each case received by a sliding bush 28 and extend through a corresponding hole 29 in the carrier. This arrangement used in the gear mechanism housing which is not illustrated forms the pivot axis 30.

Since in the bearing 21 according to the invention, the pivot axis 30 of the worm shaft 10 extends in the region of the coupling 15, a smaller axial offset between the coupling and worm shaft can be ensured. The loading of the coupling 15 is thereby reduced, which has a positive effect on the service-life of the coupling 15 and the acoustics. An additional fixing of the carrier 25 in the gear mechanism housing is omitted, whereby costs can be saved.

Figure 7:
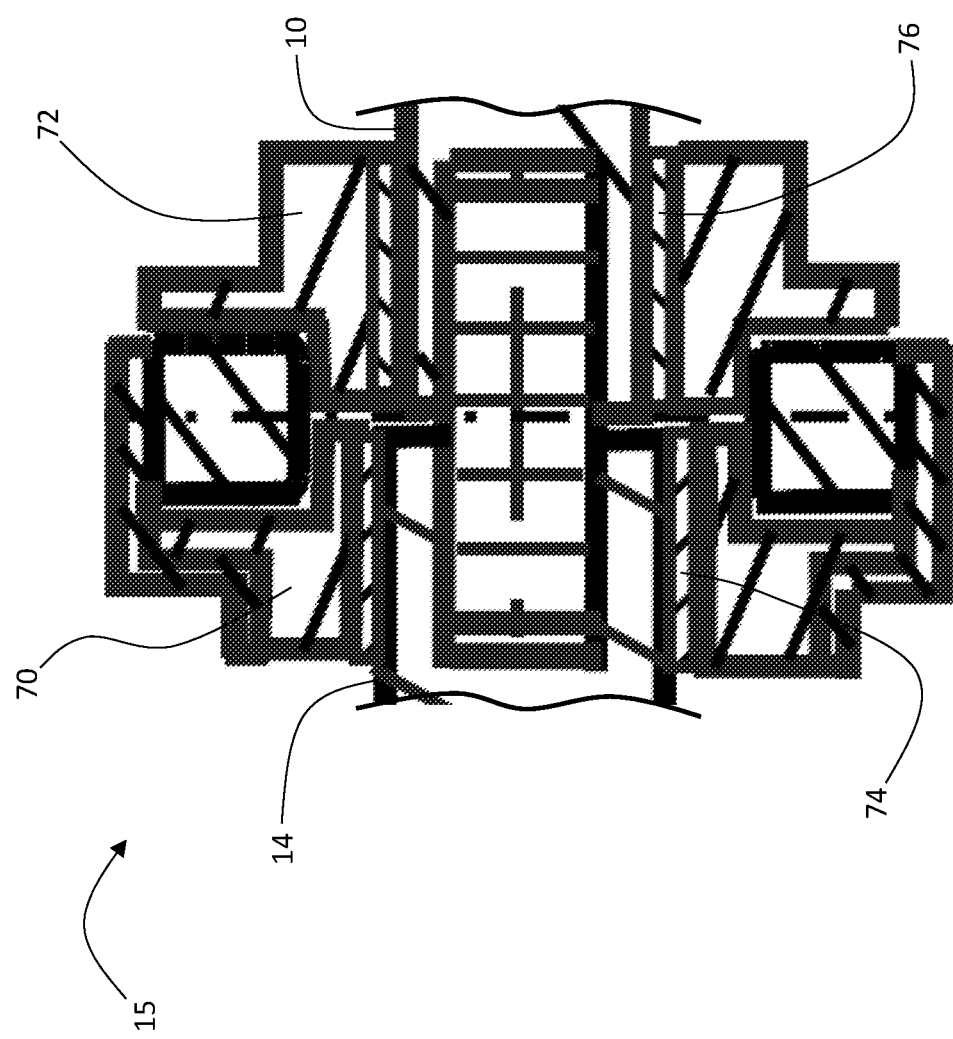
FIG. 7 is a close-up detail view of the example coupling shown in FIG. 3.

FIG. 7 illustrates the example coupling 15 in more detail. In particular, the coupling 15 in this example comprises at least two coupling components 70, 72 that engage one inside the other and which are each connected to a corresponding shaft 14, 10 by means of a bearing bush 74, 76 in a rotationally secure manner.

What is claimed is:

1. An electromechanical power steering system, comprising:
   an electric servo motor including a motor shaft,
   a shaft driven by the motor shaft, the shaft meshing with a helical wheel,
   a gear mechanism housing in which the shaft is arranged, the shaft supported at one end thereof adjacent the motor in a bearing so as to be able to be rotated about a rotation axis, wherein the bearing is a roller bearing arranged in a carrier that retains the bearing, wherein the motor shaft is coupled to the shaft in a rotationally secure manner by means of a coupling which is configured to compensate for an axial offset,
   wherein the shaft is further pivotably supported about a pivot axis which is perpendicular to the rotation axis, and
   wherein the pivot axis is arranged in a region of the coupling and extends through the coupling.

2. The electromechanical power steering system of claim 1, wherein the pivot axis, about which the carrier, the bearing, and the shaft are pivotably supported in the gear mechanism housing, is defined by two pins which are arranged in the gear mechanism housing and which are located on the pivot axis.

3. The electromechanical power steering system of claim 2, wherein the carrier of the roller bearing comprises opposing holes and the gear mechanism housing accordingly comprises corresponding recesses for receiving the two pins.

4. The electromechanical power steering system of claim 3, wherein the two pins are cylindrical pins and enable a pivoting of the bearing about the pivot axis.

5. The electromechanical power steering system of claim 1, wherein the carrier of the roller bearing is constructed in a pot configuration and with a pot edge projecting axially beyond an inner ring of the roller bearing in a the direction of the coupling.

6. The electromechanical power steering system of claim 5, wherein the opposing holes are formed in a region of the pot edge.

7. The electromechanical power steering system of claim 1, wherein the pivot axis extends centrally through the coupling.

8. The electromechanical power steering system claim 1, wherein the helical wheel is a worm wheel and the shaft is a worm shaft.

9. The electromechanical power steering system of claim 8, wherein the worm wheel is disposed on an input shaft or a pinion of a steering gear mechanism, with the worm wheel and the input shaft or the pinion being operationally connected to a steering shaft.

10. An electromechanical power steering system comprising:
    an electric servo motor including a motor shaft
    a shaft driven by the motor shaft, the shaft meshing with a helical wheel; and
    a gear mechanism housing in which the shaft is arranged, the shaft supported at one end thereof adjacent the motor in a bearing so as to be able to be rotated about a rotation axis, and wherein the motor shaft is coupled to the shaft in a rotationally secure manner by means of a coupling which is configured to compensate for an axial offset, wherein the coupling comprises at least two coupling components which engage one inside the other and which are each connected to a corresponding shaft by means of a bearing bush in a rotationally secure manner;
    wherein the shaft is further pivotably supported about a pivot axis which is perpendicular to the rotation axis, and
    wherein the pivot axis is arranged in a region of the coupling and extends through the coupling.

11. The electromechanical power steering system of claim 10 wherein the pivot axis, about which the carrier, the bearing,. and the shaft are pivotably supported in the gear mechanism housing, is defined by two pins which are arranged in the gear mechanism housing and which are located on the pivot axis.

12. The electromechanical power steering system of claim 11 wherein the carrier of the roller bearing comprises opposing holes and the gear mechanism housing accordingly comprises corresponding recesses for receiving the two pins.

13. The electromechanical power steering system of claim 10 wherein the pivot axis extends centrally through the coupling.

14. The electromechanical power steering system of claim 10 wherein the carrier of the roller bearing is constructed in a pot configuration and with a pot edge projecting axially beyond an inner ring of the roller bearing in a direction of the coupling.

15. An electromechanical power steering system, comprising:
    an electric servo motor including a motor shaft;
    a shaft driven by the motor shaft, the shaft meshing with a helical wheel;
    a gear mechanism housing in which the shaft is arranged, the shaft supported at one end thereof adjacent the motor in a bearing so as to be able to be rotated about a rotation axis, and wherein the motor shaft is coupled to the shaft in a rotationally secure manner by means of a coupling which is configured to compensate for an axial offset; and
    sliding bushes configured to receive the two pins provided in corresponding recesses formed in the gear mechanism housing,
    wherein the shaft is further pivotably supported about a pivot axis which is perpendicular to the rotation axis, wherein the pivot axis is arranged in a region of the coupling and extends through the coupling.

16. The electromechanical power steering system of claim 15 wherein the pivot axis, about which the carrier, the bearing,. and the shaft are pivotably supported in the gear mechanism housing, is defined by two pins which are arranged in the gear mechanism housing and which are located on the pivot axis.

17. The electromechanical power steering system of claim 16 wherein the carrier of the roller bearing comprises opposing holes and the gear mechanism housing accordingly comprises corresponding recesses for receiving the two pins.

18. The electromechanical power steering system of claim 15 wherein the pivot axis extends centrally through the coupling.

19. The electromechanical power steering system of claim 15 wherein the carrier of the roller bearing is constructed in a pot configuration and with a pot edge projecting axially beyond an inner ring of the roller bearing in a direction of the coupling.

20. The electromechanical power steering system of claim 15 wherein the helical wheel is a worm wheel and the shaft is a worm shaft, wherein the worm wheel is disposed on a steering shaft.

* * * * *